United States Patent [19]

Cowley

[11] 4,043,533

[45] Aug. 23, 1977

[54] AUXILIARY CLOSING FORCE FOR VALVES

[75] Inventor: John M. Cowley, North Reading, Mass.

[73] Assignee: Atwood & Morrill Co., Salem, Mass.

[21] Appl. No.: 604,733

[22] Filed: Aug. 14, 1975

[51] Int. Cl.² ............................................. F16K 31/122
[52] U.S. Cl. ...................................... 251/57; 60/547; 251/30
[58] Field of Search ................. 60/542, 543, 544, 571, 60/572, 547; 251/29, 54, 57, 63.6, 251, 30, 261

[56] References Cited

U.S. PATENT DOCUMENTS

| 1,918,424 | 7/1933 | Pontow et al. | 60/571 |
| 3,114,297 | 12/1963 | Gizeski | 251/57 |
| 3,182,971 | 5/1965 | Wakeman et al. | 251/57 |
| 3,531,078 | 9/1970 | Hose et al. | 251/54 |

*Primary Examiner*—Martin P. Schwadron
*Assistant Examiner*—G. L. Walton
*Attorney, Agent, or Firm*—Marvin A. Naigur; John E. Wilson

[57] ABSTRACT

A valve having a valve stem in the form of an actuating rod connected with a hydraulic piston in an hydraulic cylinder and an air piston in an air cylinder and which is closed by a spring has a system for assisting the spring in closing the valve and in maintaining it closed. As the actuating rod travels during the closing operation, a pressure differential across the air piston is exerted and thereafter the pressure differential across the hydraulic piston is exerted to assist the spring in closing the valve and to maintain it in a closed position.

2 Claims, 1 Drawing Figure

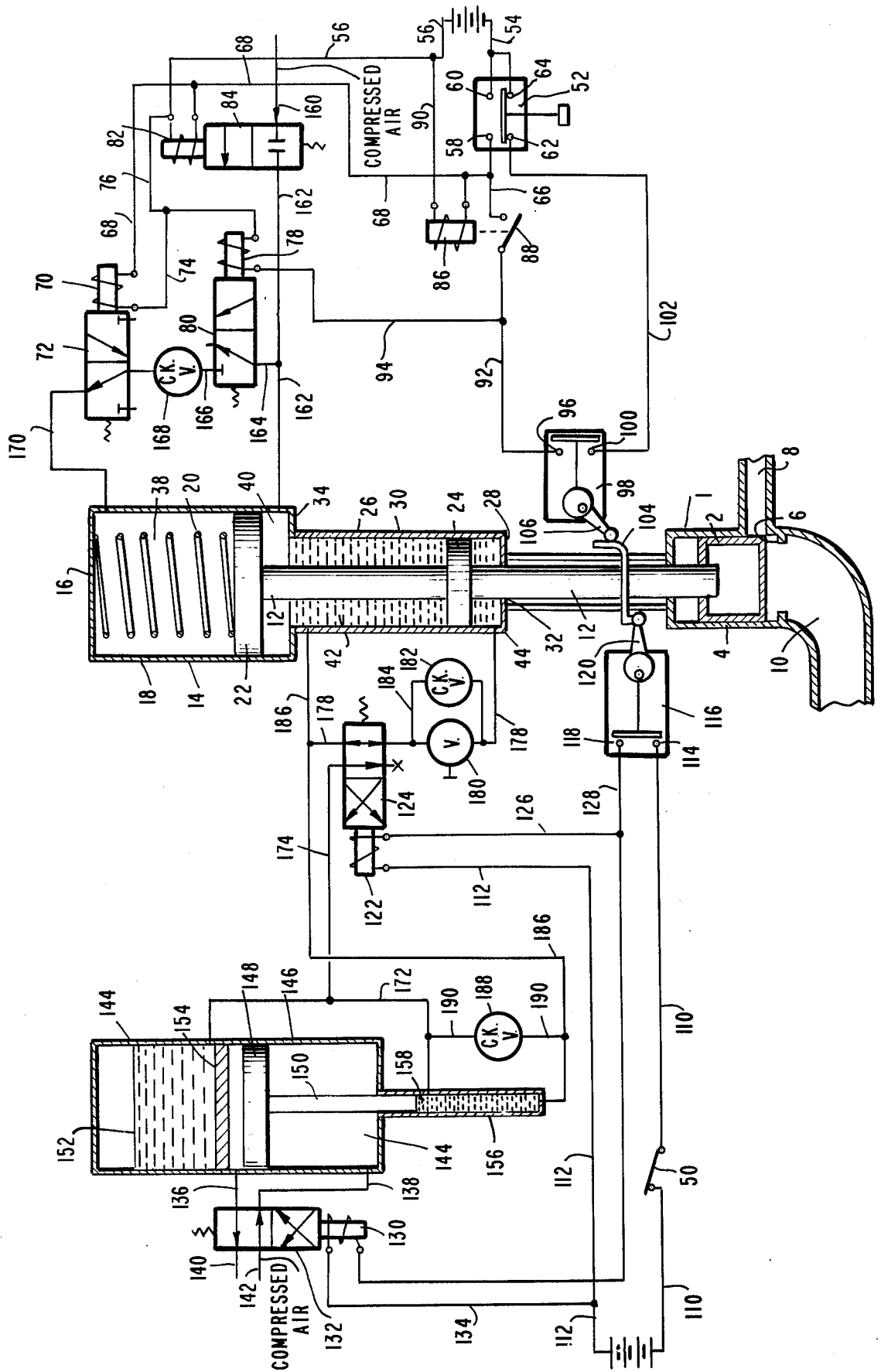

4,043,533

AUXILIARY CLOSING FORCE FOR VALVES

BACKGROUND OF THE INVENTION

Usually large valves are closed by a spring force which is supplied from a spring which is maintained in compression, and which exerts a force on an actuating rod which is connected with or integral with the valve stem. The valve is opened by air under pressure which forces a piston connected to the actuating rod against the bias of the spring in the direction necessary to open the valve. Thus, if air pressure should drop, the valve would close under the action of the spring to give the system a fail-safe feature. Many large valves must be provided with a fail-safe closing system which will close the valve in the event of a catastrophe such as an earthquake or serious fire.

An example of a large valve which must be provided with a system for exerting a large closing force, and for maintaining the valve closed, is a large valve used in a main steam line between the steam generator and turbines in a large power plant. In nuclear power plants it is required that main steam isolation valves be capable of shutting safely when the air lines to the valve actuator are fractured as by an earthquake. This requirement is not easily met because the valves must overcome the high pressure in the steam line while being closed in spite of the fact that the air lines to the valves have been fractured, and the source of energy used to close the valves has been impaired.

SUMMARY OF THE INVENTION

It is an object of the present invention to overcome drawbacks found in the prior art such as those discussed above. Accordingly, a main valve having an actuating rod which is spring actuated to close the valve, an air cylinder which is pressurized to open the valve against the bias of the spring, and a hydraulic cylinder with a hydraulic piston connected with the actuator rod is provided with a power booster for pressurizing the hydraulic fluid in the hydraulic cylinder during a portion of the actuator rod's travel during the closing operation whereby the closing operation includes the bypass of air on either side of the air piston, and at a latter period of the closing operation the depressurization of the side of the air cylinder toward which the air piston moves to close the main valve and lastly a period whereby the power booster pressurizes the hydraulic cylinder so that sufficient force is available to close said main valve and to maintain it in a closed position.

BRIEF DESCRIPTION OF THE DRAWING

The drawing is a schematic view of an auxiliary closing system for valves which is made in accordance with the present invention.

DETAILED DESCRIPTION OF THE PREFERRED EMBODIMENT

The drawing shows diagrammatically a closing system made in accordance with the present invention. The drawing shows a main steam valve indicated generally as 1 having a closure member 2 slidably mounted in a generally cylindrical body 4 so that it can seat on a valve seat 6 to close the valve 1. When seated the closure 2 prevents fluid flow from a valve inlet 8 to an outlet 10. The valve inlet 8 and outlet 10 are connected to and part of a main steam line such as one between a steam generator and turbine in a steam power plant.

The valve 1 can be used with a main valve of any construction. For example, the valve shown in U.S. Pat. No. 3,531,078 to Hose et al. is such a valve. Other types of valves such as "gate valves" could be used just as well.

An actuator rod 12 is connected with the main valve 1 so that when the actuator rod 12 is lowered, the main valve 1 is closed and when the actuator valve 12 is raised, the main valve 1 is opened. Situated within an air cylinder 14 having a head 16 and a cylindrical side wall 18 is a coil spring 20 which is compressed between the head 16 and an air piston 22. The air piston 22 is mounted on the end of the actuator rod 12.

Spaced from the air piston 22 is a hydraulic piston 24 which is also mounted on the actuator rod 12 and which is positioned within a hydraulic cylinder 26 which has, at its lower end, a head 28, and which also has a cylindrical side wall 30. The actuator rod 12 extends through the head 28 but little or no leakage of hydraulic fluid occurs because an annular seal 32 is placed between the actuator rod 12 and the head 28 so that the actuator rod 12 can slide through the seal 32 as the main valve 1 opens and closes.

The hydraulic cylinder 26 is shown as having a smaller diameter than the air cylinder 14 with the top of the hydraulic cylinder 26 and the bottom of the air cylinder 14 being joined by an annular horizontal wall 34. The air piston 22 divides the air cylinder 14 into an upper chamber 38 and a lower chamber 40. Since the piston 22 slides within the cylinder 14 during operation, the volumes of the upper chamber 38 and lower chamber 40 will both change during the opening and closing of the valve. Similarly, the hydraulic piston 24 divides the hydraulic cylinder 26 into an upper chamber 42 and a lower chamber 44. During valve operation the hydraulic piston 24 will move and therefore the volumes of the upper chamber 42 and lower chamber 44 will change.

During normal operation it is necessary to maintain the valve 1 in open position by maintaining the actuator rod 12 in a raised position so that the spring 20 is compressed. This is done by air pressure in the lower chamber 40 of the air cylinder 14. During the valve closing operation the air pressure differential across the air piston 22 is at first equalized and then made so that the pressure in the upper chamber 38 is much greater than in the lower chamber 40. Later in the closing operation the hydraulic pressure in the upper chamber 42 of the hydraulic cylinder 26 is made much higher than the hydraulic pressure in the lower chamber 44. The opening and closing operations are controlled by compressed air, hydraulic and electrical circuits which will now be described.

When the main steam valve 1 is in the open position, the actuator rod 12 is raised to its uppermost position, and the spring 20 is compressed, by compressed air within the lower chamber 40 of the air cylinder 14.

In order to open the main steam valve 1, a remote control switch 50 is opened and a main valve control switch 52 is actuated. The main valve control switch 52 is connected to a power line 54 which with another power line 56 make up a pair of power lines which are attached to a power source such as a battery as shown. The main valve control switch 52 has four terminals 58, 60, 62 and 64. The terminals 60 and 64 are each connected to the power line 54, whereas the terminal 58 is connected to a line 66 which in turn is connected to a line 68.

The line 68 is connected to a solenoid coil 70 which actuates a three-way valve 72. The solenoid coil 70 is also connected to a line 74 which in turn is connected with a line 76 which at its ends is connected to the power line 56 and a solenoid coil 78 which actuates a three-way valve 80. The end of the power line 56 is connected to a solenoid coil 82 which actuates a solenoid valve 84. The solenoid coil 82 is also connected to the line 68.

The line 68 is also connected with a solenoid coil 86 which actuates a relay switch 88. The coil 86 is also connected to a line 90 which connects the coil 86 with the power line 56.

The relay switch 88 is connected to a line 92 which is connected to a line 94, which is connected to the solenoid coil 78.

The line 92 is also connected to a terminal 96 of a limit switch 98 which has another terminal 100 which is connected through a line 102 to the terminal 62 of the main valve control switch 52. The limit switch 98 is actuated by a cam 104 which is mounted on the actuator rod 12. The limit switch 98 has a cam follower 106 which when moved by the cam 104 opens the limit switch 98.

The remote control switch 50 is placed in a power line 110 which along with a power line 112 can be connected to the same power source as are the power lines 54 and 56 or to a separate power source such as the battery shown. The power line 110 is connected at its end to a terminal 114 of a limit switch 116 which has another terminal 118. The limit switch 116 has a cam follower 120 which when engaged by a surface on the cam 104 closes the limit switch 116 to provide electrical continuity between the terminals 114 and 118.

The power line 112 is connected at its end to a solenoid coil 122 which actuates a four-way valve 124. The solenoid coil 122 is also connected to a line 126 which in turn is connected to a line 128 which connects the terminal 118 of the limit switch 116 with a solenoid coil 130.

The solenoid coil 130 actuates a four-way valve 132. The solenoid coil 130 is also connected to the power line 112 through the line 134.

The four-way valve 132 is connected to air lines 136 and 138 which in turn are alternately connected to an exhaust line 140 and to an air supply line 142 as the four-way valve 132 is operated. The air lines 136 and 138 are connected to a power booster 144. The power booster 144 has a cylinder 146 in which is slidably positioned a piston 148 which is mounted on the end of a piston rod 150. The cylinder 146 is separated from an oil reservoir 152 by a cylinder head 154. The piston rod 150 extends into an oil cylinder 156 which is of a much smaller diameter than is the cylinder 146. The end 158 of the piston rod 150 serves as an oil piston within the oil cylinder 156.

The air line 136 connects the four-way valve 132 with the head portion of the cylinder 146, whereas the air line 138 connects the four-way valve 132 with the portion of the cylinders 146 below the piston 148. The cylinder 146 is sealed below the piston 148.

Another air line 160 is connected to the solenoid valve 84 and receives compressed air from a source which may be the same source which provided compressed air to the air line 142. The solenoid valve 84 also is connected to an air line 162 which in turn connects with the air cylinder 14 below the air piston 22. The air line 162 connects with the air line 164 which in turn is connected to the three-way valve 80.

An air line 166 connects the three-way valve 80 with the three-way valve 72. A check valve 168 is positioned in the air line 166 and the three-way valve 72 is connected to the air cylinder 14 through an air line 170 which opens into the cylinder 14 above the air piston 22.

The present invention has a hydraulic circuit which will now be described. The oil reservoir 152 is filled with a hydraulic fluid such as oil and is connected to the oil cylinder 156 through an oil line 172. The oil line 172 is connected with the four-way valve 124 through an oil line 174. The four-way valve 124 is connected to hydraulic cylinder 26 through an oil line 178. A speed control valve 180 is placed in the oil line 178 for controlling the rate of oil flow through that line. A check valve 182 bridges the speed control valve 180 through an oil line 184.

The oil line 178 connects with the hydraulic cylinder 26 on the side of the hydraulic piston 24 farthest from the air cylinder 14. An oil line 186 connects the hydraulic cylinder 26 at the end closest to the air cylinder 14 with the oil cylinder 156. A check valve 188 is placed in an oil line 190 which at one end connects with the oil line 172 and at the other end connects with the oil line 186.

During normal operation the main steam valve is held open by air under the air piston 22 in the air cylinder 14. The coil spring 20 is compressed considerably when the main steam valve 1 is open during normal operation. If the main steam valve 1 is closed and it is desired to open the main steam valve 1, the remote control switch 50 is opened and the main valve control switch 52 is closed so that the terminals 58 and 60 are bridged. This closes the relay switch 88, since electrical energy is made available at the solenoid coil 86, because continuity is established between the power line 54 through the main valve control switch 52, the electrical line 66, the line 68, the solenoid 86, the line 90, and the power line 56. As a result, the three-way valves 72 and 80 as well as the two-way valve 84 are actuated. This is so because energization of the solenoid coil 86 closes the relay switch 88 so that continuity is established through the line 92, line 94, coil 78, lines 76 and 74, coil 70, line 68, coil 82 and line 56. When the valves are energized, they slide away from their coils so that compressed air in line 160 will pass through the solenoid valve 84 and the line 162 to the bottom of the air cylinder 14. The line 164 will supply compressed air through the three-way valve 80 and the check valve 168 to the three-way valve 72. However, the three-way valve 72, when actuated, will prevent pressurization of the line 170 and the air cylinder 14 above the piston 22. The three-way valve 72 will vent the space of the air cylinder 14 above the piston 22. Pressurization in the air cylinder 14 below the piston 22 raises the piston and the actuator rod 12 which opens the main steam valve by raising the closure member 2 off the valve seat 6. When the actuator rod 12 has travelled approximately half of its stroke, the limit switch 98 is opened because the cam 104 engages the follower 106. While the main steam valve 1 is opening, the hydraulic piston 24 meets substantially no resistance because oil can flow freely between the upper chamber 42 and the lower chamber 44 of the hydraulic cylinder 26 through the line 184 and then down the line 178 to the lower chamber 44. In passing through the line 178 the oil flows through the four-way valve 124 and through the check valve 182. It should be mentioned that the remote control switch 50 should be opened before the main valve control switch 52 is actuated to assure that there will be no operation of the piston 158 or the four-way valve 124. The limit switch 116 opens during the opening of the main steam valve 1, but since the remote control switch 50 is open, the limit switch 116 is not energized, so that its opening has no effect. Once the main steam valve 1 is opened, the remote control switch 50 is closed, so that the main steam valve 1 will close automatically upon a failure of steam pressure at the location in the steam line being monitored.

A sensing element (not shown) senses a trip signal to the main valve control switch 52. Upon receipt of this signal, solenoids 70 and 82 are deenergized because continuity no longer exists between the terminals 58 and 60. However, since limit switch 98 is closed, the solenoid 78 is energized because continuity exists from the power line 54 through the line 102 and limit switch 98, lines 92 and 94, solenoid 78 and line 76 to the power line 56. Thus, the lower chamber 40 of the air cylinder 14 is bypassed to the upper chamber 38 through the air line 170, three-way valve 72, line 166, check valve 168, three-way valve 80, line 164 and line 162. Since the solenoid 82 is deenergized, the solenoid valve 84 prevents the pressurization of the lower chamber 40 of the air cylinder 14. Bypassing air from the lower chamber 38 to the upper chamber 42 removes any differential pressure across the air piston 22 so that it is moved downward under the force exerted by the spring 20. The speed at which the main steam valve 1 closes is controlled in order to prevent damage during the closing operation. This is accomplished by the speed control valve 180 which as already explained limits the rate of oil flow between the lower chamber 44 and upper chamber 42 of the hydraulic cylinder 26 as the piston 24 descends. At a preselected point in the closing operation the limit switch 98 is actuated because the cam 104 engages the follower 106. This opens the limit switch 98 to deenergize the solenoid 78 so that the three-way valve 80 vents the lower chamber 40 to the atmosphere through lines 162 and 164. Since the upper chamber 38 is pressurized, and the air within the chamber 38 cannot escape through the check valve 168, and three-way valve 80, the piston 22 is now acted upon by the sum of the forces exerted by the air pressure within the upper chamber 38 and the spring 20. The air pressure in the chamber 38 will be present even if the supply of compressed air to the system is disturbed.

The motive force continues to diminish as the spring extends and the air pressure acting on the piston 22 becomes less as the volume of the upper chamber 38 increases during the piston travel downward. Still later in the closing operation the cam 104 engages the follower 120 of the limit switch 116 to close the limit switch 116. Since the remote control switch 50 is already closed, the four-way solenoid valve 124 is actuated because the solenoid 122 is energized. The energization of the solenoid 122 occurs when the limit switch 116 and remote control switch 50 are closed because of continuity between the power line 110 and line 128 through the limit switch 116, the line 126, solenoid coil 122 and power line 112.

Actuation of the four-way valve 124 prevents bypass from the upper chamber 42 to the lower chamber 44 of the hydraulic cylinder 26 because oil cannot pass from the lines 184 and 178 through the four-way valve 124. The lower chamber 44, however, is connected to the oil reservoir 152 because the oil line 178 can communicate with the oil line 174 through the four-way valve 124. Since oil rushing from the lower chamber 44 of the hydraulic cylinder 26 to the oil reservoir 152 still passes through the speed control valve 180 the speed at which the main valve 1 closes is still controlled. The closing of the limit switch 116 also energizes the solenoid 130 because continuity is established from the line 110 through the limit switch 116 to the line 128, the solenoid coil 130 and the line 134 to the power line 112. This vents the space within the cylinder 146 below the piston 148 to the atmosphere and pressurizes the chamber below the head 154 and above the piston 148 with compressed air available in the air line 142 through the line 136. The air pressure above the piston 148 is resolved into a force which compresses oil within the oil cylinder 156 and below the piston 158 which is the end of the piston rod 150. As a result, the oil within the oil cylinder 156 reaches a very high pressure. The highly pressurized oil is fed through the oil line 186 to the upper chamber 42 of the hydraulic cylinder 26 so that the hydraulic piston 24 exerts a very large downward force. This force is used to complete the closing of the main steam valve 1, and to provide a high load when the valve is fully closed to maintain it in closed position.

During the first portion of the downward travel of the piston rod 150, oil can travel in the oil line 172 to the reservoir 152 but after the bottom 158 of the piston rod 150 has passed the point at which the oil line 172 is connected to the oil cylinder 156, the oil cannot travel upward through the line 190 because the check valve 188 prevents such flow. When the closing operation is complete, and it is desired to open the main steam valve 1, the piston 148 can be raised and the oil cylinder 156 filled with oil from the oil reservoir 152 through the line 172 and through the lines 190 and 186 in which the check valve 188 will allow flow of oil through the oil line 190 toward the line 186.

The foregoing describes but one preferred embodiment of the present invention, other embodiments being possible without exceeding the scope of the following claims.

What is claimed is:

1. A system for closing a steam valve and maintaining said steam valve shut comprising;
    an actuating rod connected with said valve and movable to open and close said valve;
    an air cylinder;
    an air piston in said cylinder mounted on said actuator rod;
    a spring connected with said actuator rod for urging said rod in a direction to close said steam valve;
    a hydraulic cylinder;
    a hydraulic piston mounted on said actuator rod between said air piston and said cylinder and slidably mounted in said hydraulic cylinder;
    a power booster comprising; a pneumatic cylinder, an oil cylinder, a pneumatic piston slidably mounted in said pneumatic cylinder, an oil piston of substantially smaller area than said pneumatic piston, said oil piston being slidably mounted in said oil cylinder and connected with said pneumatic piston so that movement of said pneumatic piston will cause movement of said oil piston an oil line connecting said oil cylinder to said hydraulic cylinder at a location between said hydraulic piston and said air piston;

means to supply air under pressure to said air cylinder to hold said air piston and said actuating rod in a position whereby said steam valve is open;

means to place the opposite ends of said air cylinder in communication so that the air pressures on opposite sides of said air piston are substantially equal so that said spring urges said air piston and said actuator rod to move in a direction to begin an operation closing said steam valve;

means to exhaust the end of said air cylinder toward which said air piston is traveling to the atmosphere at a later portion of the closing operation so that the air pressure within said air cylinder exerts a force on said piston in the same direction as the force exerted on said piston by said spring; and means to operate said power booster at a still later stage of the valve closing operation to supply oil to said hydraulic cylinder under pressure to urge said hydraulic piston in said direction to hold said steam valve shut.

2. The system defined in claim 1 wherein the said means to operate said power booster comprises a cam surface on said actuator rod, a source of electric energy, a limit switch having a follower, a solenoid operated valve for admitting compressed air into said pneumatic cylinder, an electric circuit between said source of electric energy and said solenoid operated valve with said limit switch in said circuit whereby when said actuator rod is moved to a position where said cam surface energizes said follower to close said limit switch, said solenoid operated valve will be energized to admit compressed air into said pneumatic cylinder to move said pneumatic piston and said oil piston.

* * * * *